United States Statutory Invention Registration [19]

[11] Reg. Number: H558

Coomes et al.

[43] Published: Dec. 6, 1988

[54] RADIATION SHIELDING PELLETS

[75] Inventors: Edmund P. Coomes, Richland; Andrzej T. Luksic, Pasco, both of Wash.

[73] Assignee: The United States of America as represented by the Department of Energy, Washington, D.C.

[21] Appl. No.: 20,070

[22] Filed: Feb. 27, 1987

[51] Int. Cl.[4] ..... G21C 11/02; G21F 3/00; B32B 15/04

[52] U.S. Cl. ..... 252/478; 376/288; 250/515.1; 428/471

[58] Field of Search ..... 428/403, 469, 328, 402.2, 428/402.24; 376/280

[56] References Cited

U.S. PATENT DOCUMENTS 4,130,459 12/1978 Parker et al. ..... 376/280

4,507,359 3/1985 Powers, Jr. ..... 428/403

4,657,784 4/1987 Olson ..... 408/403

*Primary Examiner*—John F. Terapane

*Assistant Examiner*—Eric Jorgensen

*Attorney, Agent, or Firm*—Edward V. Hiskes; Robert Southworth, III; Judson R. Hightower

[57] ABSTRACT

Radiation pellets having an outer shell, preferably, of Mo, W or depleted U and an inner filling of lithium hydride wherein the outer shell material has a greater melting point than does the inner filling material.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADATION SHIELDING PELLETS

GOVERNMENT CONTRACT

This invention was made or conceived in the course of or under a contract with the U.S. Department of Energy.

BACKGROUND OF THE INVENTION

This invention relates in general to radiation shielding means, and more particularly to radiation shielding pellets containing at least two shielding materials within individual pellets.

Radiation shields often contain more than one type of material in order to provide attentuation over the entire spectrum of incident radiation. One common type of shielding application requires a gamma ray shielding metal such as tungsten or steel in combination with a hydrogen-rich neutron shielding material such as lithium hydride.

Since the radiation shield must provide uniform attenuation over a large surface area, the two required materials must be prevented from separating within the shield. This means that lithium hydride in a shield must be trapped in place. If it is allowed to liquify or form vapor bubbles, portions of the shield volume will come to have an incorrect ratio of LiH versus metal, and shielding will not be uniform.

Prior art shielding systems have dealt with this problem by attempting to maintain all portions of the shield below the melting point of LiH. The interior of the shield was filled with a honeycomb-like structure of tungsten or steel with LiH placed in the cells of the honeycomb. The metallic honeycomb conducted heat away from the LiH and to the outer surface of the shield.

However, honeycomb structures are difficult to fabricate, particularly if an active cooling means, such as a fluid flow heat removal system, is required. Moreover, honeycombs and cooling pipes required to maintain LiH in solid form tend to be heavy. This makes them undesirable for use in systems requiring active cooling which must be launched into space.

In addition, in shields wherein lithium hydride is cast and allowed to solidify, cracks often develop in the solid lithium hydride. These permit radiation to stream through.

OBJECTS OF THE INVENTION

Thus, it is one object of this invention to provide a radiation shield, incorporating more than one type of material, which is easy to fabricate.

It is a further object to provide a pelletized radiation shielding material which can operate at elevated temperatures without failure, despite liquifaction or cracking of the hydrogen-rich neutron absorbing material.

It is a further object to provide a shield which is light weight and therefore particularly suitable for space applications.

SUMMARY OF THE INVENTION

These and other objects are obtained by forming shielding materials into pellets, wherein the exterior of each capsule is formed of a high melting point gamma ray shielding material, such as steel or tungsten, and the interior is formed of a lower melting point neutron shielding substance, such as lithium hydride.

DESCRIPTION OF THE PREFERRED EMBODIMENT

Figure 1:
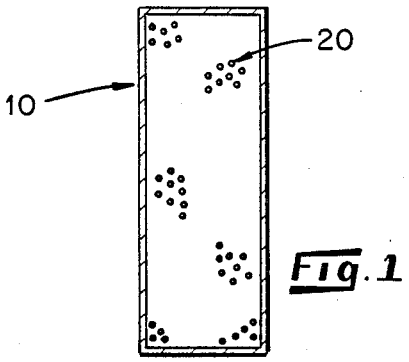
FIG. 1 is a diagram of a shield containing pelletized shielding material.

FIG. 1 is a diagram of a shield containing pelletized shielding material. Shield retaining wall 10 may be of any convenient shape or material consistent with structural requirements. Pellets of shielding material 20 are used as fill within the shield. Pellets 20 may be of any convenient size. However, pellets of about one-quarter inch length are conveniently handled and placed into shields of odd shapes.

Figure 2:
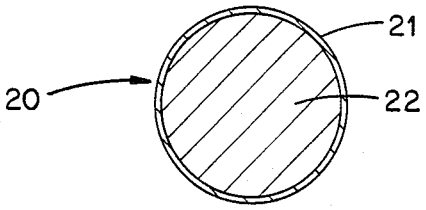
FIG. 2 is a diagram of an individual pellet.

FIG. 2 is a diagram of an individual pellet. The outer shell of the pellet 21 is composed of a high melting point material, for example tungsten, molybdenumn, depleted uranium, or iron. This material will inhibit the passage of particular types of radiation and not inhibit to the same extent other types of radiation.

Filling 22 comprises another type of shielding material. Ideally, this material will have shielding properties complementary to those of the outer shell. Thus, the radiation which the material in the outer shell does not shield against tends to be absorbed by materials inside the pellets. Lithium hydride is a typical material that can be used for filling of pellets. Typically, the filling material may be any substance which is rich in hydrogen. Thus, paraffins, plastics, and other hydrocarbon-rich materials could be used. If a thick outer shell is employed, water would also be a suitable filling material. Typically, the outer shell material will be a heavy metal with a higher melting point than the filling. Typically, a hydrogen-rich pellet filling will retard neutrons, and a heavy metal shell will act against gamma rays.

Figure 3:
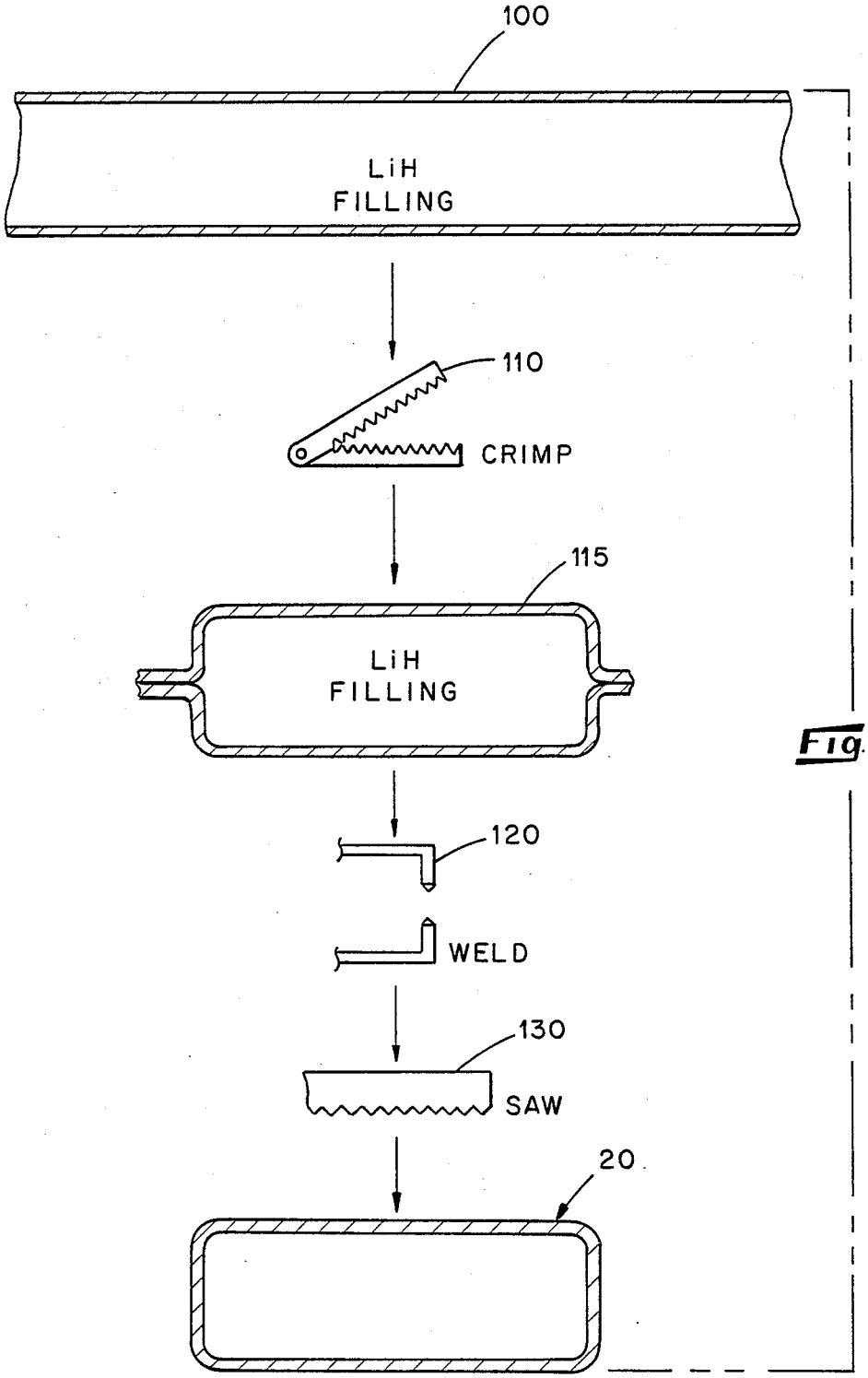
FIG. 3 is a diagram illustrating one method of manufacture 8 for pellets of shielding material.

As pellet 20 heats during use of the shield, filling 22 will eventually crack, melt, and perhaps, vaporize. Thus, outer shell 21 should be chosen to be of sufficient thickness so as to resist internal pressures exerted when filling 22 is heated. Adequate thickness may be determined by constructing pellets with shells of varying thickness and then heating them to the maximum rated temperature of the shield. For quarter inch pellets of steel or tungsten, filled with lithium hydride, a shell of one-sixteenth inch thickness will be adequate for temperatures of 500 degrees FIG. 3 is a diagram illustrating one method of manufacture for pellets of shielding material. Lengths of steel or tungsten tubing 100 are filled with liquid lithium hydride, which is then allowed to solidify. Crimping tool 110 is then used to crimp the tubing at quarter-inch intervals in order to form crimped sections of tubing 115. Arc welder 120 is then applied to the tubing in order to seal the ends of individual crimped sections. Finally, saw 130 is used to cut crimped sections of the tubing into individual pellets.

Figure 4:
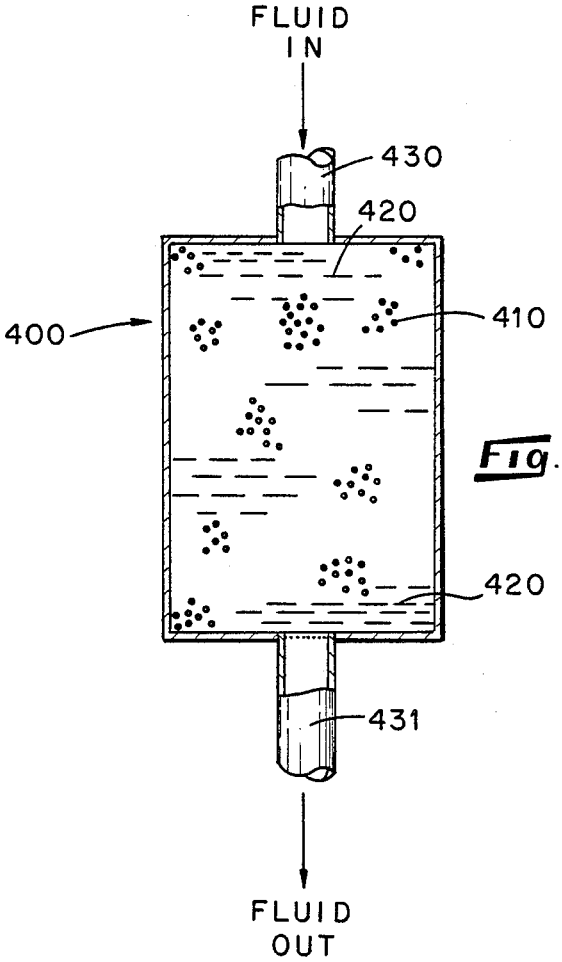
FIG. 4 is a diagram of an actively cooled shield constructed using pellets of shielding material.

FIG. 4 is a diagram of a shield constructed using shielding pellets. Container 400 is filled with a bed of shielding pellets, 410. Container 400 may be made in any convenient shape. It functions merely to physically restrain pellet bed 410 and to provide a containier for cooling fluid 420, which flows through the pellet bed.

Cooling fluid 420 enters container 400 via inlet port 430, picks up heat from shielding pellet bed 410, and exits via outlet port 431. Thus, heat is conveyed from the shield.

The foregoing is a description of a preferred embodiment of this invention. However, the invention need not be limited to particular types of shielding materials or pellet sizes.

What we claim is:

1. Radiation shielding pellets comprising:

an outer shell of radiation shielding material having a first melting point; and an inner filling of radiation shielding material having a second melting point, wherein said first melting point is greater than said second melting point.

2. The pellets of claim 1 wherein said outer shell comprises a metal effective for shielding against gamma rays.

3. The pellets of claim 2 wherein said metal is selected from the group containing: iron, molybdenum, tungsten, depleted uranium, and alloys thereof.

4. The pellets of claim 1 wherein said inner filling comprises lithium hydride.

5. The pellets of claim 2 wherein said inner filling comprises lithium hydride and said outer shell is selected from the group containing tungsten, iron, molybdenum, depleted uranium, and alloys thereof.

6. A bed of radiation shielding pellets comprising pellets and retention means effective for maintaining a plurality of said pellets in position with repect to one another and also effective for containment of a cooling fluid in contact with said pellets, wherein said pellets comprise an outer shell of a first shielding material and an inner filling of a second shielding material; and wherein said retention means further comprises means for admission and exit of said cooling fluid.

* * * * *